US009380116B2

(12) United States Patent
Han et al.

(10) Patent No.: US 9,380,116 B2
(45) Date of Patent: Jun. 28, 2016

(54) METHOD AND APPARATUS FOR PROTECTING PERSONAL INFORMATION IN A HOME NETWORK

(75) Inventors: Se-Hee Han, Seoul (KR); Joo-Yeol Lee, Seoul (KR); Dong-Shin Jung, Suwon-si (KR); Je-Young Maeng, Suwon-si (KR); Fei Fei Feng, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1743 days.

(21) Appl. No.: 12/544,678

(22) Filed: Aug. 20, 2009

(65) Prior Publication Data

US 2010/0049965 A1    Feb. 25, 2010

(30) Foreign Application Priority Data

Aug. 20, 2008  (KR) .................. 10-2008-0081421
Mar. 4, 2009   (KR) .................. 10-2009-0029149
Aug. 14, 2009  (KR) .................. 10-2009-0075449

(51) Int. Cl.
*G06F 21/00*    (2013.01)
*H04L 29/08*    (2006.01)
*G06F 21/62*    (2013.01)

(52) U.S. Cl.
CPC .......... *H04L 67/125* (2013.01); *G06F 21/6263* (2013.01)

(58) Field of Classification Search
CPC .................. G06F 21/6263; H04L 67/125
USPC ........................................ 713/151
See application file for complete search history.

(56) References Cited

U.S. PATENT DOCUMENTS

| 6,601,092 | B2* | 7/2003 | Itabashi et al. ............... 709/217 |
| 7,130,895 | B2* | 10/2006 | Zintel ................ H04L 12/2805 709/220 |
| 7,218,714 | B2* | 5/2007 | Liu et al. .................. 379/202.01 |
| 7,613,412 | B2 | 11/2009 | Harada et al. |
| 7,827,235 | B2 | 11/2010 | Iiizuka |
| 7,904,504 | B2 | 3/2011 | Erickson et al. |
| 8,234,387 | B2 | 7/2012 | Bradley et al. |
| 2002/0049902 | A1* | 4/2002 | Rhodes ......................... 713/153 |
| 2003/0131142 | A1* | 7/2003 | Horvitz ................ G06F 21/335 719/313 |
| 2003/0219127 | A1* | 11/2003 | Russ et al. ..................... 380/239 |
| 2004/0064575 | A1* | 4/2004 | Rasheed et al. ............... 709/232 |

(Continued)

FOREIGN PATENT DOCUMENTS

| JP | 9-266507 | 10/1997 |
| JP | 2003-271560 | 9/2003 |

(Continued)

OTHER PUBLICATIONS

Espacenet search, Espacenet Result List, Jan. 2012.*

(Continued)

*Primary Examiner* — Shan Elahi
(74) *Attorney, Agent, or Firm* — The Farrell Law Firm, P.C.

(57) ABSTRACT

A method for protecting personal information in a home network is provided, in which a controlled device receives a subscribe request for a service of the controlled device, from a control point, and accepts the subscribe request. The controlled device receives information about the control point from the control point, and performs event delivery to the control point according to a policy that is set based on the information about the control point, when an event occurs in the controlled device.

12 Claims, 10 Drawing Sheets

(56) References Cited

U.S. PATENT DOCUMENTS

| | | | |
|---|---|---|---|
| 2004/0158634 A1* | 8/2004 | Saito et al. .................... 709/225 |
| 2004/0168083 A1* | 8/2004 | Gasparini ............... G06F 21/31 726/10 |
| 2004/0260800 A1* | 12/2004 | Gu ...................... H04L 12/2805 709/223 |
| 2005/0074018 A1 | 4/2005 | Zintel et al. |
| 2005/0097503 A1* | 5/2005 | Zintel ................. H04L 12/2803 717/100 |
| 2005/0188050 A1* | 8/2005 | Son et al. ....................... 709/208 |
| 2005/0267935 A1* | 12/2005 | Gandhi ............... H04L 29/1232 709/203 |
| 2006/0004924 A1 | 1/2006 | Trossen |
| 2006/0041924 A1* | 2/2006 | Bushmitch et al. ............ 725/132 |
| 2006/0112417 A1* | 5/2006 | Son et al. ........................... 726/3 |
| 2006/0168292 A1* | 7/2006 | Yukimatsu .......... H04L 63/0428 709/231 |
| 2006/0184530 A1 | 8/2006 | Song et al. |
| 2006/0209768 A1 | 9/2006 | Yan et al. |
| 2007/0143488 A1* | 6/2007 | Pantalone ..................... 709/230 |
| 2008/0066145 A1 | 3/2008 | Molen et al. |
| 2009/0193469 A1 | 7/2009 | Igarashi |
| 2011/0093927 A1 | 4/2011 | Leppanen et al. |

FOREIGN PATENT DOCUMENTS

| | | |
|---|---|---|
| JP | 2005-275845 | 10/2005 |
| JP | 2006-024197 | 1/2006 |
| JP | 2007-087002 | 4/2007 |
| JP | 2007-521585 | 8/2007 |
| JP | 2007-526526 | 9/2007 |
| JP | 2008-152648 | 7/2008 |
| KR | 1020060105935 | 10/2006 |
| WO | WO 2007/102694 | 9/2007 |
| WO | WO 2007/105568 | 9/2007 |

OTHER PUBLICATIONS

Leach "A Universal Unique Identifier (UUID) URN Namespace". 2005.*

Bodlaender et al, "UPnP 1.1-Designing for Performance & Compatibilty", 2005.*

Miller et al, "Home Networking with Universal Plub and Play", 2001.*

Miller et al, Home Networking with Universal Plug and Play, 2001.*

Jammes et al., "Service-Oriented Device Communications using the Devices Profile for Web Services", 21st International Conference on Advanced Information Networking and Applications Workshops, May 21, 2007.

Wang et al., "Services and Policies for Care at Home", Pervasive Health Conference and Workshops, Nov. 1, 2006.

Ramakrishna et al.: "Negotiating Aggreements Using Policies in Ubiquitous Computing Scenarios", IEEE International Conference on Service-Oriented Computing and Applications (SOCA'07), Jun. 1, 2007.

Miller et al.: "Home Networking with Universal Plug and Play", IEEE Communications Magazine, Dec. 2001.

Architecture Universal Plug and Play, UPnP Standard, Interface, Jul. 2003.

Japanese Office Action dated Oct. 21, 2014 issued in counterpart application No. 2014-006954.

Sato Kazunori, "Practice Course for SIP Authentication, Security Overview of 2nd TLS and Usage in SIP, N + I Network," Jun. 1, 2004.

Korean Office Action dated Nov. 19, 2015 issued in counterpart application No. 10-2009-0075449, 11 pages.

* cited by examiner

```
SUBSCRIBE publisher path HTTP/1.1
HOST: publisher host:publisher port
USER-AGENT: OS/version UPnP/1.1 product/version
CALLBACK: <delivery URI>
NT: upnp : event
TIMEOUT: Second-requested subscription duration
```

```
SUBSCRIBE publisher path HTTP/1.1
HOST: publisher host:publisher port
USER-AGENT: OS/version UPnP/1.1 product/version
CALLBACK: <delivery URI>
NT: upnp : event
TIMEOUT: Second-requested subscription duration
SUBSCRIBER.UPNP.ORG: uuid of CP, friendly name of the CP
```

```
<FilterList>
    <ServiceId>urn:upnp-org:serviceId:TS:1</ServiceId>
    <EventingStateVariable>
        <Name>ReceivingCallInfo</Name>
        <AllowTargetList>
            <CP Encrypt="Yes" EncryptKeyID=0>
                <Name>ACME Widget Model XYZ</Name>
                <Alias> Mark's Game Console</Alias>
                <Hash>TMzI2OzM0NTueYgi93Q==</Hash>
            </CP>
        </AllowTargetList>
        <DenyTargetList>
            <User>Tom</User>
        </DenyTargetList>
    </EventingStateVariable>
</FilterList>
```

FIG.11

METHOD AND APPARATUS FOR PROTECTING PERSONAL INFORMATION IN A HOME NETWORK

PRIORITY

This application claims priority under 35 U.S.C. §119(a) to Korean Patent Applications filed in the Korean Intellectual Property Office on Aug. 20, 2008, Apr. 3, 2009, and Aug. 14, 2009 and assigned Serial No. 10-2008-0081421, 10-2009-0029149, and 10-2009-0075449, respectively, the disclosures of which are incorporated herein by reference.

BACKGROUND OF THE INVENTION

1. Field of the Invention

The present invention relates generally to Universal Plug and Play (UPnP), or a middleware protocol for home networking, and more particularly, to a method and an apparatus for protecting personal information of users in a UPnP-based home network.

2. Description of the Related Art

In general, a home network, which consists of Internet Protocol (IP)-based private networks, connects and controls various types of devices used in a home, such as Personal Computers (PCs), intelligent products and wireless devices. These devices are connected to a single network through a common virtual computing environment called "middleware."

The term "middleware" refers to software that connects various digital devices on a peer-to-peer basis and enables communication between the devices. Various types of technology, such as Home AV Interoperability (HAVI), UPnP, Java Intelligent Network Infra-structure (JINI), and Home Wide Web (HWW), have been proposed as middleware.

Since the addition of Plug and Play (PnP) functions to current operating systems, it has been very easy to install and set peripheral devices of PCs. UPnP, which has evolved from PnP, enables various home appliances and network devices, such as network printers and Internet gates, to perform networking, especially home networking. UPnP provides convenient functions to the entire network based on Internet standard technologies, such as Transmission Control Protocol/Internet Protocol (TCP/IP), Hyper Text Transfer Protocol (HTTP), and eXtensible Markup Language (XML).

A UPnP network consists of Controlled Devices (CDs), which are connected to and controlled by an IP-based home network. The UPnP is also consisted of Control Points (CPs) for controlling the CDs. The UPnP network performs communication between the CPs and the CDs through the use of a UPnP protocol stack structure that includes Internet protocols such as TCP/IP and HTTP, and technologies such as XML and Simple Object Access Protocol (SOAP).

In a first addressing step of UPnP communication, a CP and a CD have their own individual IP addresses. Upon joining the network, the CD fetches its IP address using a Dynamic Host Configuration Protocol (DHCP), or it is assigned an IP address using automatic IP addressing if there is no DHCP server in the network.

In a second discovery step, the CP searches for the CD, or the CD advertises its location. The discovery step is performed using a Simple Service Discovery Protocol (SSDP). If the CD is added to the network, the CD delivers an SSDP alive message to the network through IP multicasting. The CP can determine the presence/absence of the CD through the reception of the alive message. When the CP newly joins the network, the CP multicasts an SSDP Multicast-search (M-search) message to the network. All of the CDs, which checked the M-search message, send M-search response messages containing their own information to the CP.

In a third description step, the CP checks the description content of the CD. When the CP wants the CD after checking the response message, the CP may send to the CD a request for detailed information related to the CD. The CD, which has received the request, sends its information in an XML document.

In a fourth control step, the CP operates the CD by controlling a function of the CD. When the CP intends to control an arbitrary CD, the CP sends a desired service to the CD using SOAP, based on the detailed information related to the CD. SOAP is a protocol that is written on HTTP by XML for the purpose of invoking (or calling) a remote function.

In a fifth event step, the CP receives an event change of the CD. The CP sends a subscribe request for a relevant event to the CD when the CP desires to receive an event message from the CD. If the subscription is successful, the CD sends an event message to the CP using General Event Notification Architecture (GENA).

In a sixth presentation step, the CP presents a State of the CD using a Hyper Text Markup Language (HTML) of the CD.

Figure 1:
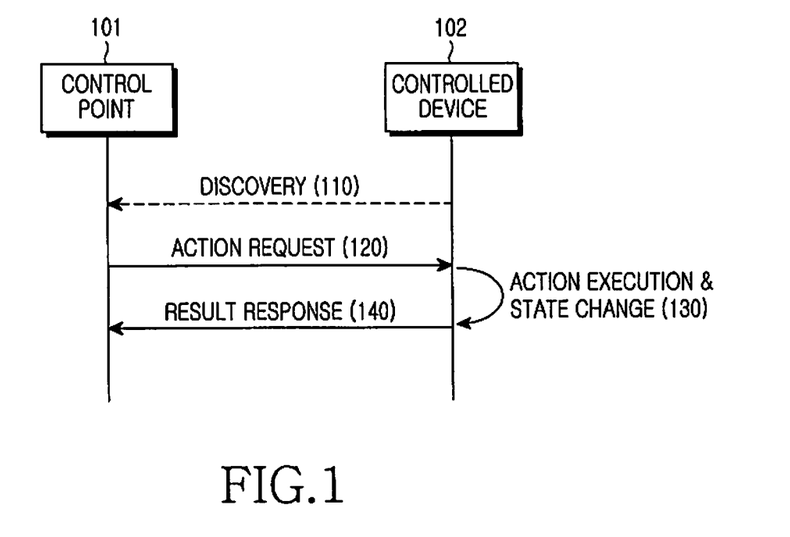
FIG. 1 is a diagram illustrating device discovery and action execution in a conventional UPnP network system.

FIG. 1 is a diagram illustrating device discovery and action execution in a conventional UPnP network system.

Referring to FIG. 1, in step 110, a CP 101 discovers or searches for a CD 102, or the CD 102 advertises its location. In step 120, the CP 101 sends an action request to the CD 102. In step 130, the CD 102 performs an action corresponding to the received action request. In step 140, the CD 102 provides a response to the CP 101 with the action result. More specifically, the CD 102 performs the requested action, and transmits the execution result for the action or an error message to the CP 101.

Based on the above-described basic UPnP control method, a UPnP CD can provide various services (or functions) to the CP. For example, based on the basic UPnP control method, a UPnP CP can control the UPnP CD in which Audio/Visual (A/V) content is stored, so that the A/V content can be played back in other UPnP CDs. When the UPnP CD is a gateway, the UPnP CP can change and set an IP address band and addresses of a subnet and a gateway, to be assigned to the devices in the home, by controlling the UPnP gateway, or the CD.

Figure 2:
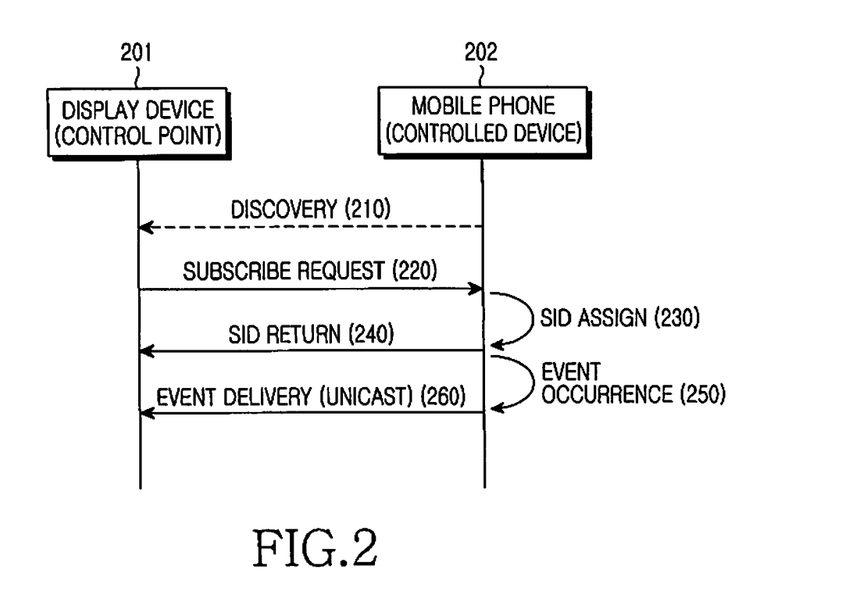
FIG. 2 is a diagram illustrates an event notification operation in a conventional UPnP network system.

FIG. 2 is a diagram illustrating an event notification in a conventional UPnP network system.

Referring to FIG. 2, in step 210, a CP (or display device) 201 searches for a CD (or mobile phone) 202, or the CD 202 advertises its location. In step 220, the CP 201 sends a request for event reception/registration (or subscribes) to the CD 202. Upon receipt of the subscribe request, the CD 202 assigns a Subscribe ID (SID) in step 230, and delivers the assigned SID to the CP 201 in step 240. If an event occurs in the CD 202 in step 250, the CD 202 delivers the event to the CP 201 in step 260. If there is a change in an event-related state variable among state variables defined in association with respective UPnP services, the CD 202 delivers the relevant event to the CP 201 that sent the subscribe request.

Figure 3:
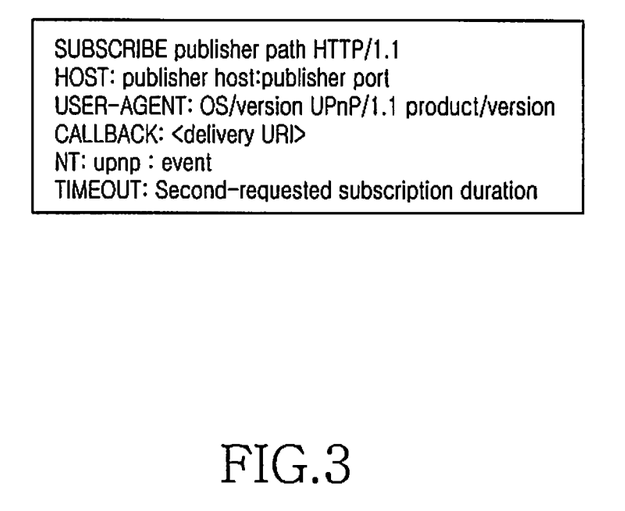
FIG. 3 is a subscribe request message from a CP to a CD in a conventional UPnP network system.

FIG. 3 is a diagram illustrating a subscribe request message from a CP to a CD in a conventional UPnP network system. Methods and headers of the subscribe message follow the format defined in UPnP Device Architecture.

A UPnP telephony service can be provided to the CD as a UPnP service based on the above-described technology. In the telephony service, if an incoming call or a text message is received at a mobile terminal (or CD), the mobile terminal notifies the pertinent event to a display device (or CP). If the display device requests the received call information or text message information, the mobile terminal can provide the call information or text message information in response to the request.

However, because call information or text message information is delivered to the CP, event information from the CD to the CP may include a user's personal information. The result values for a UPnP action requested by the CP from the CD may also include a user's personal information stored in the CD. Thus, personal information of users enjoying the UPnP service may be leaked out.

SUMMARY OF THE INVENTION

The present invention has been made to address at least the above problems and/or disadvantages and to provide at least the advantages described below. Accordingly, an aspect of the present invention provides a personal information protection method and apparatus for preventing leakage of a user's personal information, which may occur during execution of a UPnP service in a UPnP home network.

Another aspect of the present invention provides a UPnP-based service, a series of an action invocation method, a controlled device control method and a controlled device-to-control point event method, needed to provide the UPnP service, and a controlled device and a control point device for the same.

According to one aspect of the present invention, a method is provided for protecting personal information in a home network. A controlled device receives a subscribe request for a service of the controlled device from a control point. The controlled device accepts the subscribe request. The controlled device receives information about the control point from the control point. The controlled device performs event delivery to the control point according to a policy that is set based on the information about the control point, when an event occurs in the controlled device.

According to another aspect of the present invention, a method is provided for protecting personal information in a home network. A control point sends a subscribe request for a service of a controlled device. The control point performs authentication with the controlled device. The controlled device generates a Transport Layer Security (TLS) session between the control point and the controlled device when an event occurs in the controlled device. The controlled device delivers the occurred event through the generated TLS session.

According to further another aspect of the present invention, an apparatus is provided for protecting personal information in a home network. The apparatus includes a receiver for receiving information over the home network. The apparatus also includes an event manager for determining when an event occurs, controlling event information delivery to a control point according to a policy stored in a policy information storage, and deciding whether to send an authentication request to the control point or to encrypt the event information to be delivered to the control point, based on the policy. The apparatus further includes an authentication requester for making the authentication request based on the decision of the event manager, a message encryptor for encrypting the event information based on the decision of the event manager, a target selector for selecting a target to which the event information is to be transmitted, and a transmitter for transmitting the event information.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 4:
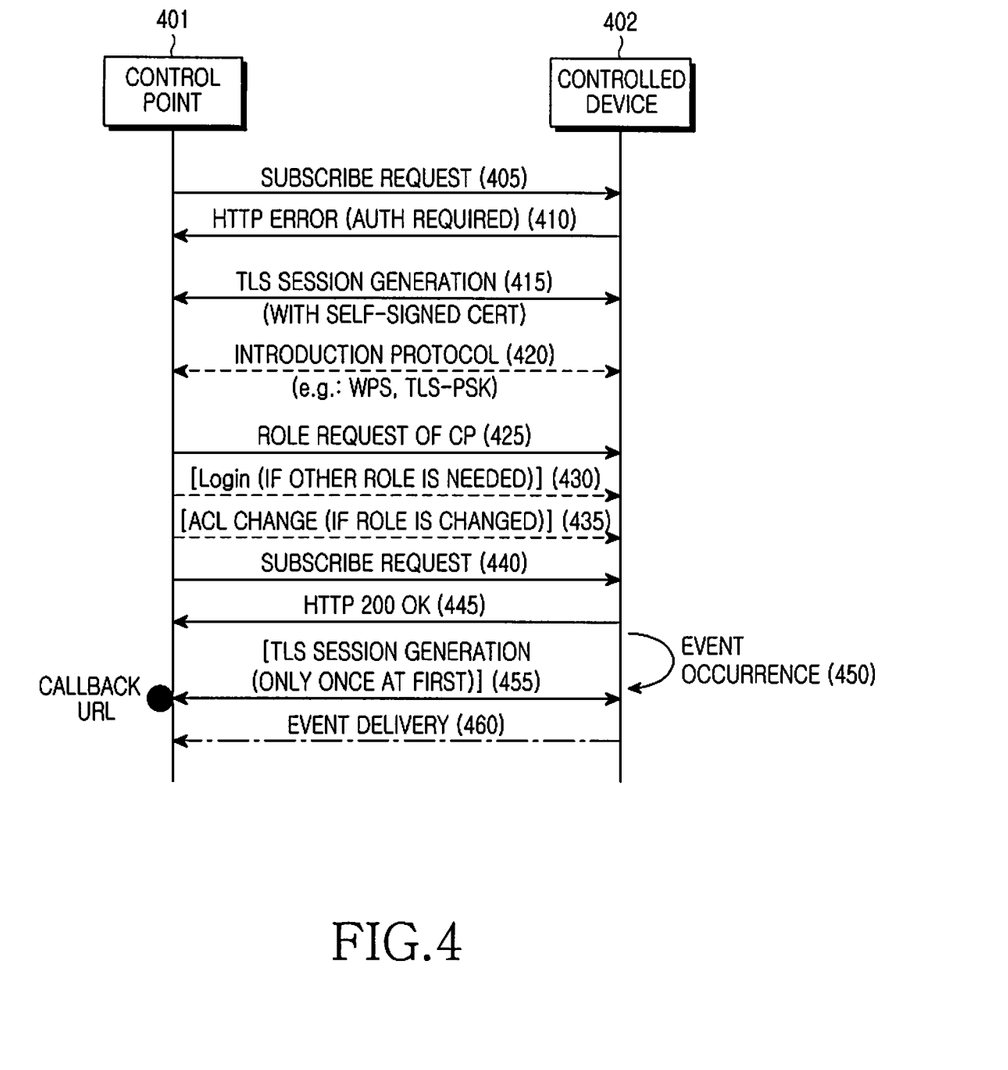
FIG. 4 is a diagram illustrating a session generation operation for event delivery during a UPnP service, according to an embodiment of the present invention.

FIG. 4 is a diagram illustrating a session generation operation for event delivery during a UPnP service, according to an embodiment of the present invention. The scheme illustrated in FIG. 4 maps SIDs and device information to subscribe requests based on session authentication. The event scheme shown in FIG. 4 causes a CP or a user issuing a subscribe request for an event of a service provided by a CD to be subject to authentication. The CD can acquire information about a device or a user as authentication results on the device or the user, and maps the acquired information to an event session.

Referring to FIG. 4, if a CP 401 sends a subscribe request to a CD 402 in step 405, the CD 402 sends an error message in response to the request in step 410. This error message is not defined in the existing UPnP Device Architecture standard, and its error code is defined as '413' in this embodiment of the present invention. Such an error code value notifies the CP 401 that sent the subscribe request of a need for an authentication process. A device supporting the authentication in the CP 401 performs a series of authentication procedures. The detailed authentication procedure and message format are defined in the UPnP Device Protection standard. In step 415, the CP 401 and the CD 402 generate a Transport Layer Security (TLS) session using a self-signed certificate for channel protection between the two devices. In step 420, in order to authenticate the CP 401, an authentication procedure is performed using an introduction protocol, such as Wi-fi Protected Setup (WPS) and Transport Layer Security Pre-Shared Key (TLS-PSK). After the generation of the TLS session, the CP 401 sends a role request to the CD 402 in step 425. When the CP 401 needs another role, the CP 401 may perform login in step 430, and when the CP 401 changes its role, the CP 401 may change an Access Control List (ACL) in step 435.

After the authentication process, the CP 401 sends a subscribe request to the CD 402 in step 440, and the CD 402 accepts the subscribe request using an accept message (hereinafter referred to as an "HTTP 200 OK message") in step 445. When sending the subscribe request in step 440, the CP 401 may deliver port information of a callback Uniform Resource Locator (URL) to the CD 402 along with the subscribe request. Thereafter, if an event occurs in a service of the CD 402 in step 450, a TLS session is generated, a single time at first, in step 455. During the TLS session generation, the CD 402 generates the TLS session on the port of the callback URL that the CP 401 delivered along with the subscribe request. The CD 402 delivers the event to the CP 401 in step 460.

During the TLS session generation, the CD 402 may reuse the TLS session that it used during the authentication procedure.

Figure 5:
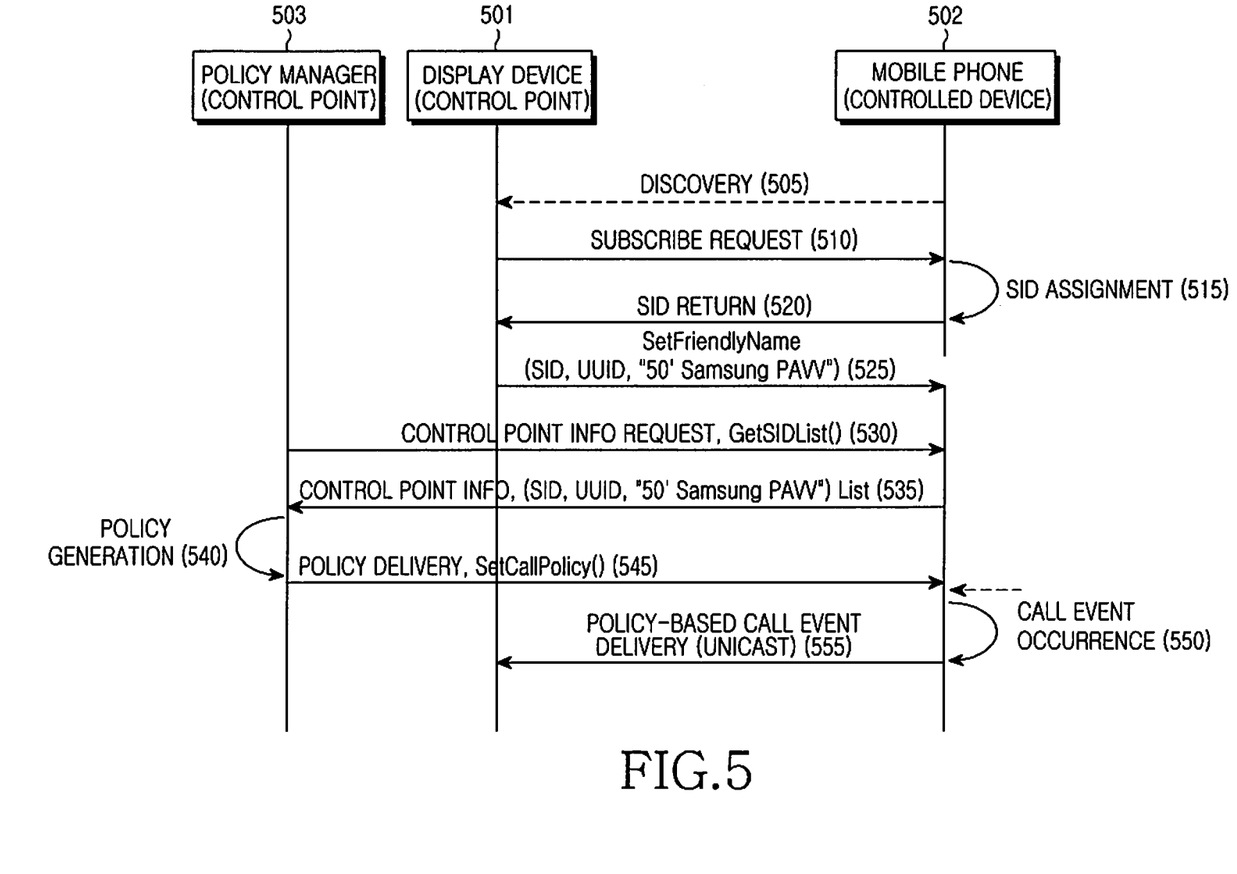
FIG. 5 is a diagram illustrating a policy-based event delivery operation during a UPnP service, according to an embodiment of the present invention.

FIG. 5 illustrates a policy-based event delivery operation during a UPnP service, according to an embodiment of the present invention. In this embodiment of the present invention a mobile phone serves as a CD, a display device serves as a CP, and the policy-based event delivery operation is performed during occurrence of a call event in a UPnP telephony service.

Referring to FIG. 5, in step 505, a CP 501 discovers a CD 502, or the CD 502 advertises its location. In step 510, the CP 501 sends a subscribe request to a telephony service of the CD 502. In step 515, the CD 502 assigns an SID to the CP 501, accepting the subscribe request from the CP 501. In step 520, the CD 502 returns the assigned SID to the CP 501. In step 525, the CP 501 maps its Universally Unique Identifier (UUID) and friendly name information to the assigned SID, and the mapped information is stored in the CD 502. This is performed by a SOAP action such as 'SetFriendlyName( )'.

Mapping information of the CP 501 to the assigned SID and storing the mapped information is a basic operation of the CP 501 that uses the telephony service. The CD 502 uses the mapped information to deliver an event to selected ones of multiple CPs.

A user can invoke a 'SetFriendlyName( )' action using the CP 501, or the 'SetFriendlyName( )' action can be set to be automatically invoked upon receipt of a response to the subscribe request.

According to an embodiment of the present invention, another CP device can generate a policy by collecting information on CPs that sent the subscribe request. This CP device is referred to as a policy manager 503.

In step 530, the policy manager 503 may collect the information on CPs by invoking, for example, a 'GetSIdList( )' action at the CD 502. In step 535, the policy manager 503 receives a list of CP information stored in the CD 502. The information list includes mapping information between SIDs that the CD 502 assigned to individual CPs, and UUIDs and friendly names of the CPs. In step 540, the policy manager 503 generates a policy based on the received information. Based on user input, the policy manager 503 may set a CP to which a call/SMS reception event is to be delivered and a CP to which events are not to be delivered. The policy manager 503 may also set whether to perform an authentication request in response to a detailed information request for a call/SMS event from a CP, or whether to encrypt detailed event information. That is, the policy manager 503 generates an event policy by setting event delivery conditions (at least one of delivery of event information, authentication request for event information delivery, and encryption of event information) based on user input regarding each service.

In step 545, the policy manager 503 delivers the generated policy to the relevant CD 502 by invoking, for example, an 'SetCallPolicyo' action.

Thereafter, if a call event occurs in step 550 as an incoming call is received at the relevant CD 502, the CD 502 delivers the call event to the CP 501 according to the set policy in step 555.

Figure 6:
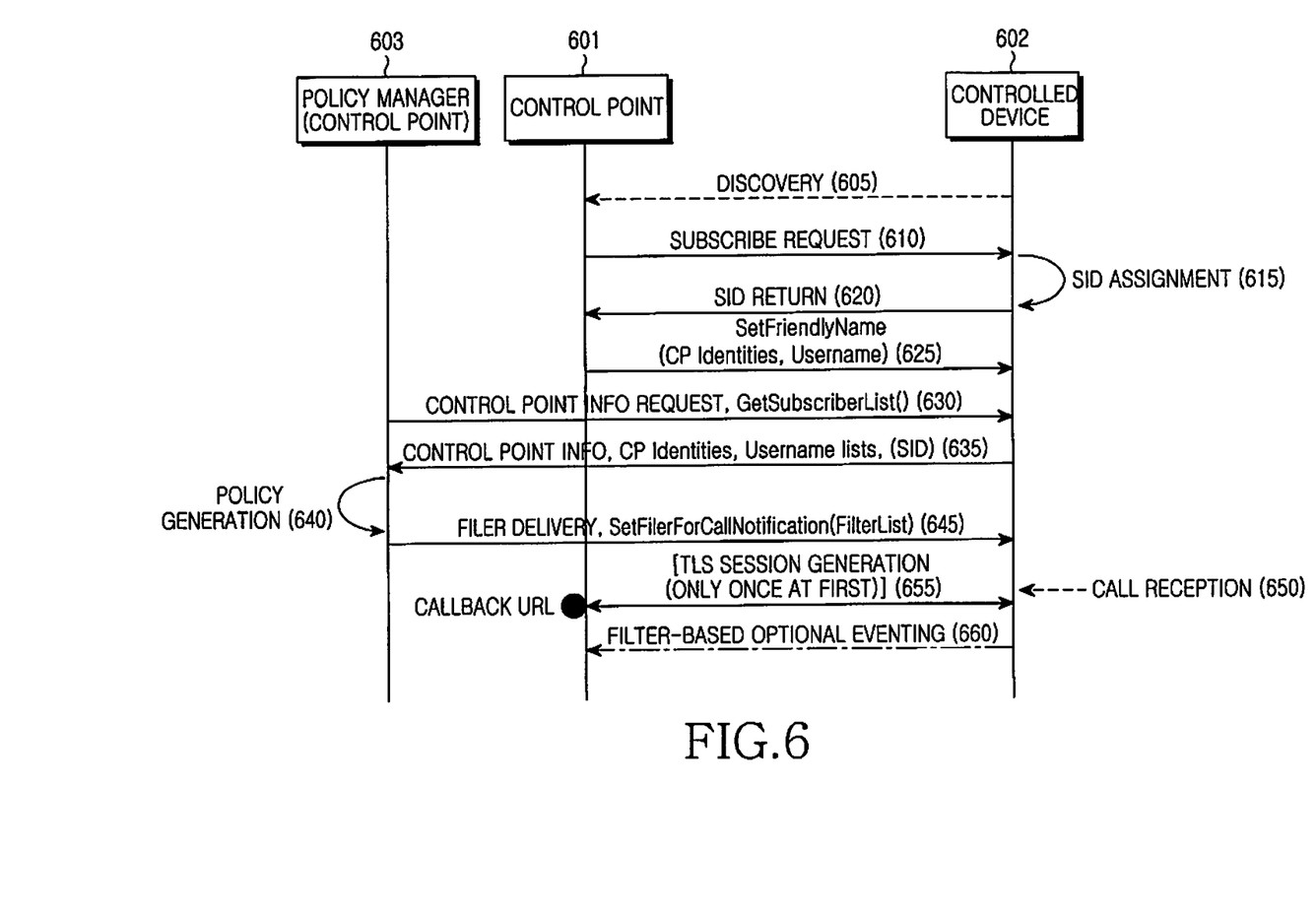
FIG. 6 is a diagram illustrating a filter-based event delivery operation during a UPnP service, according to another embodiment of the present invention.

FIG. 6 illustrates a filter-based event delivery operation during a UPnP service, according to another embodiment of the present invention. The method shown in FIG. 6 sets the policy using a variety of information in addition to the friendly name information.

Referring to FIG. 6, in step 605, a CP 601 discovers a CD 602, or the CD 602 advertises its location. In step 610, the CP 601 sends a subscribe request to a telephony service of the CD 602. In step 615, the CD 602 assigns an SID to the CP 601, accepting the subscribe request from the control point 601. In step 620, the CD 602 returns the assigned SID to the CP 601.

In step 625, the CP 601 delivers its information to the CD 602, and may deliver a user name in addition to its UUID and friendly name information. This operation may be performed by a 'SetFriendlyName( )' action. A policy manager 603 sends a request for information on CPs to the CD 602 in step 630, and receives the information on CPs from the CD 602 in step 635. This operation may be performed by a 'GetSubscribeList( )' action.

In step 640, the policy manager 603 generates a policy for the CD 602, i.e., filters for event delivery, based on the information on the CP 601, which is received from the CD 602. In step 645, the policy manager 603 delivers the policy to the CD 602 using 'SetFilterForCallNotification(FilterList)'.

If a call reception event occurs in step 650, the CD 602 generates a TLS session in step 655 and optionally delivers the event according to the set policy (filter) in step 660. In step 655, the CD 602 can generate a TLS session on the port of the callback URL that the CP 601 delivered along with the subscribe request.

Accordingly, the CD 602 may divide users based on the set policy, i.e., filter, using not only IDs and SIDs of the CPs that will receive an event, but also user names, and deliver the event to the users. Even for events that are delivered to the same user, the CD 602 may filter the events by applying a specific condition according to values of the events. In addition, the CD 602 may optionally encrypt the events according to such several conditions.

Figure 11:
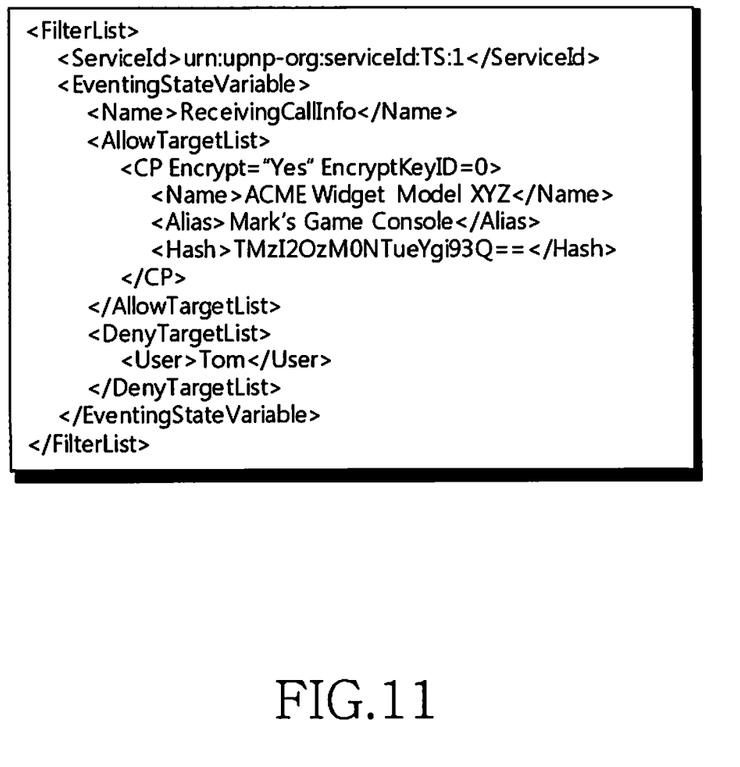
FIG. 11 is a filter list in a filter-based event delivery operation during a UPNP service, according to another embodiment of the present invention.

FIG. 11 is a filter list in a filter-based event delivery operation during a UPnP service, according to another embodiment of the present invention. As illustrated in FIG. 11, in 'AllowTargetList' of a filter, a 'ReceivingCallinfo' state variable transmits events to 'Mark's Game Console' with a name 'ACME Widget Model XYZ', and the event is encrypted using an encryption key with ID=0.

Figure 7:
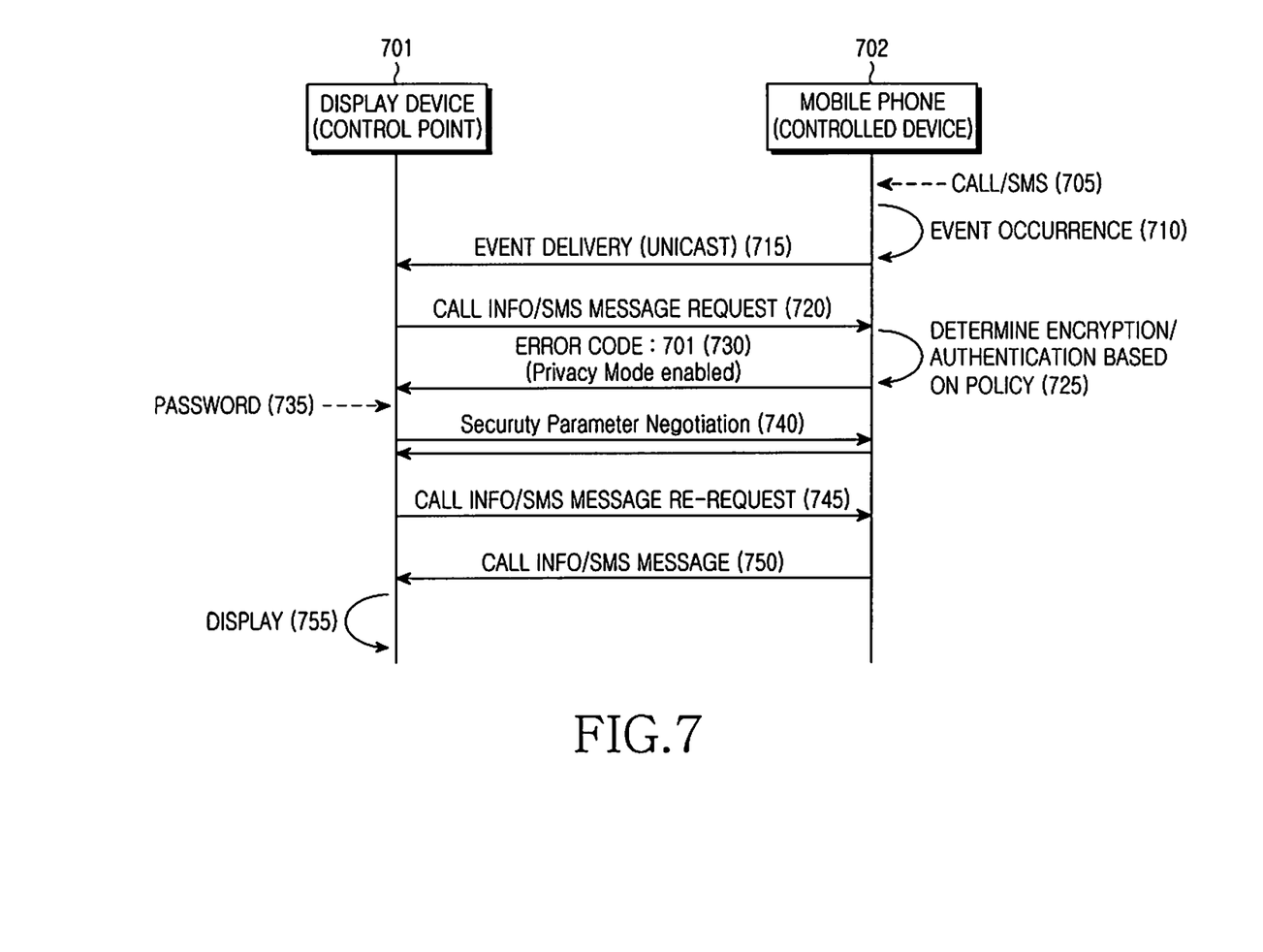
FIG. 7 is a diagram illustrating a detailed event delivery operation during a UPnP service, according to an embodiment of the present invention.
Figure 8:
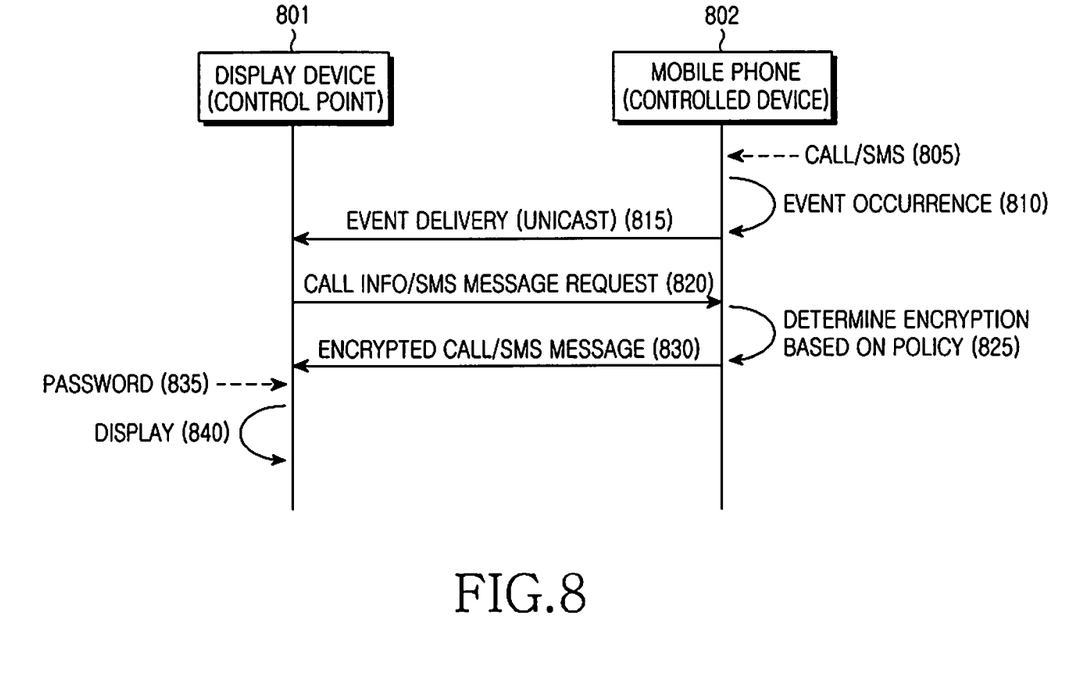
FIG. 8 is a diagram illustrating a detailed event delivery operation when encryption parameter negotiation is not performed, according to an embodiment of the present invention.

FIG. 7 is a diagram illustrating a detailed event delivery operation during a UPnP service, according to an embodiment of the present invention. FIG. 8 is a diagram illustrating a detailed event delivery operation when encryption parameter negotiation is not performed, according to an embodiment of the present invention.

In the processes shown in FIGS. 7 and 8, when a CP 701, 801 sends a request for detailed call/SMS information to a CD 702, 802, the CD 702, 802 requests authentication based on a policy or provides encrypted detailed information. However, in the operation disclosed in FIG. 7, the CD 702 provides a privacy (personal information) protection function in response to the detailed call/SMS information request from the CP 701 and a parameter negotiation necessary for authentication or encryption is needed.

If a call or an SMS is received at the CD 702 in step 705, the CD 702 determines occurrence of an event in step 710 and delivers the event to the CP 701 in step 715.

In step 720, the CP 701 sends a request for detailed information about the call/SMS to the CD 702. The CD 702 determines in step 725 whether to perform encryption or authentication, based on a set policy. The policy referred to in step 725 can be a policy that is set by the policy manager as described above with reference to FIGS. 5 and 6. When the CD 702 determines to perform encryption or authentication in step 725, the CD 702 returns an error code of 701 (Privacy Mode enabled) in response to the detailed call/SMS information request from the CP 701 in step 730.

If the error code value is 701, the CP 701 is authenticated by the CD 702 by receiving a password from the user in step 735, or the CP 701 performs parameter negotiation with the CD 702 necessary for encryption in step 740. Alternatively, both of steps 735 and 740 may be performed. If the CP 701 re-requests the detailed call/SMS information in step 745, the CD 702 provides the detailed call/SMS information based on the authentication result or the negotiated encryption parameters in step 750. In step 755, the CP 701 displays the provided information.

FIG. 8 illustrates a simplified operation for a case where encryption parameter negotiation is unneeded, according to an embodiment of the present invention.

Referring to FIG. 8, if a call or an SMS is received at the CD 802 in step 805, the CD 802 determines occurrence of an event in step 810 and delivers the event to the CP 801 in step 815.

In step 820, the CP 801 sends a request for detailed information about the call/SMS to the CD 802. In step 825, the CD 802 determines whether to perform encryption, based on a set policy. The policy referred to in step 825 can be a policy that is set by the policy manager as described above with reference to FIGS. 5 and 6. If the CD 802 determines to perform encryption in step 825, the CD 802 encrypts (encodes) a call/SMS message and sends the encrypted call/SMS message to the CP 801 in step 830.

The CP 801 decrypts (decodes) the call/SMS message received from the CD 802 by receiving a password from the user in step 835, and displays the decrypted call/SMS message in step 840.

Figure 9:
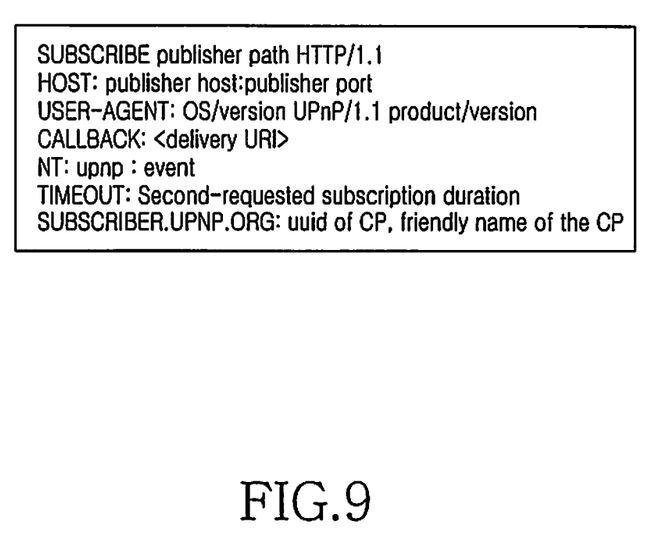
FIG. 9 is a subscribe request message in which information on a CP is included in a policy-based event delivery operation during a UPnP service, according to an embodiment of the present invention.

Instead of using a 'SetFriendlyName( )' action in delivering information on a CP to a controlled device CD, the present invention may include such information in a subscribe request message when first making a subscribe request. FIG. 9 is a subscribe request message in which information on a CP is included in a policy-based event delivery operation during a UPnP service, according to an embodiment of the present invention.

When the control point information is delivered in the subscribe request message during sending of the subscribe request in an embodiment of the present invention, an additional header may be defined in an event message in the UPnP Device Architecture standard. As illustrated in FIG. 9, the CP information may be described by further defining a SUBSCRIBER.UPNP.ORG header. The 'SetFriendlyName( )' action in FIGS. 5 and 6 may be omitted if the CP information is delivered along with the subscribe request.

Figure 10:
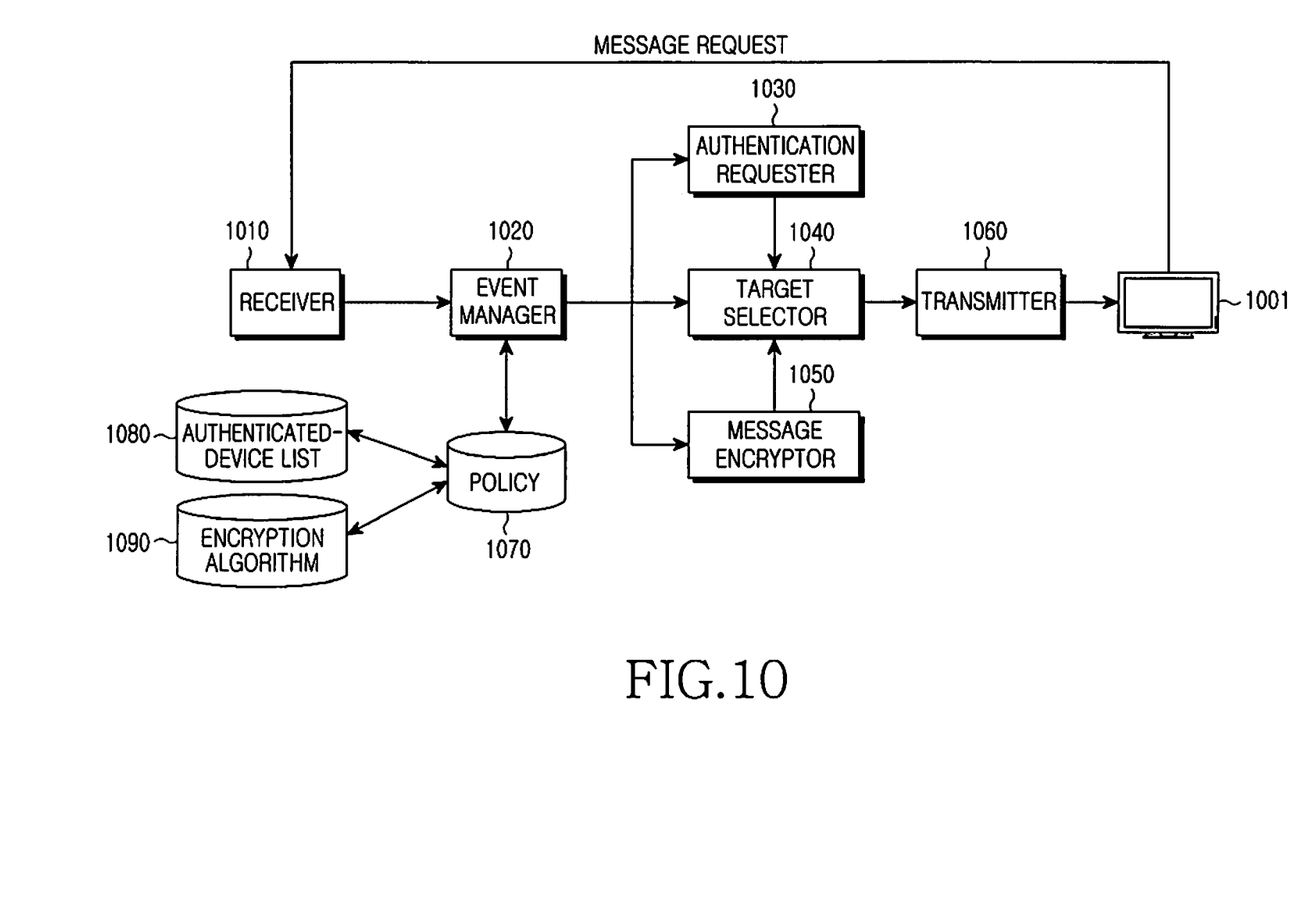
FIG. 10 is a block diagram of a device for protecting personal information during a UPnP service, according to an embodiment of the present invention.

FIG. 10 is a block diagram of a device for protecting personal information during a UPnP service, according to an embodiment of the present invention. Referring to FIG. 10, a CD for privacy protection includes a receiver 1010, an event manager 1020, an authentication requester 1030, a target selector 1040, a message encryptor 1050, a transmitter 1060, an authenticated-device list information storage 1080, a policy information storage 1070, and an encryption algorithm information storage 1090. The CD communicates with a display device 1001 that serves as a CP.

The receiver 1010 receives messages and information over a home network.

The event manager 1020 determines when an event occurs, and delivers the event only to an allowed CP according to a policy stored in the policy information storage 1070. The event manager 1020 determines whether to send an authentication request to the requesting CP 1001 or to encrypt a message to be delivered to the CP 1001 according to the policy.

The authentication requester 1030 makes an authentication request based on the decision of the event manager 1020.

The message encryptor 1050 encrypts event information based on the decision of the event manager 1020.

The target selector 1040 selects a target to which it will transmit a notification for an authentication request or event information, upon request of the event manager 1020.

The transmitter 1060 transmits the notification or the event information to the CP, or the display device 1001.

The policy information storage 1070 stores policy information received from (or set by) an external policy manager (not shown). The authenticated-device list information storage 1080 stores information about authenticated CPs. The encryption algorithm information storage 1090 stores an encryption algorithm to be used for encrypting detailed call/SMS information messages.

As is apparent from the foregoing description, according to embodiments of the present invention, when an event occurs in a service that a UPnP home network system provides to a CD, the CD performs event notification based on a set policy, without delivering the event to all CP devices that sent a subscribe request to the service. In addition, based on the set policy, the CD may request authentication or encrypt detailed event information with personal information, which is requested by the CP.

Accordingly, the present invention prevents privacy information, which is stored in the CD or provided by the CD through a service, from being included in the event information, making it possible to protect the user's personal information.

Embodiments of the present invention can also be embodied as computer-readable codes on a computer-readable recording medium. The computer-readable recording medium is any data storage device that can store data, which can thereafter be read by a computer system. Examples of computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for protecting personal information in a home network, comprising the steps of:
    receiving, by a controlled device, a subscribe request for a service of the controlled device, from a control point;
    accepting, by the controlled device, the subscribe request;
    receiving, by the controlled device, information about the control point from the control point;
    transmitting, by the controlled device, the information about the control point to a policy manager;
    receiving, by the controlled device, a policy for event information delivery to the control point, which is generated by the policy manager based on the information about the control point; and
    performing, by the controlled device, event delivery to the control point according to the policy, when an event occurs in the controlled device.

2. The method of claim 1, wherein accepting the subscribe request comprises assigning, by the controlled device, a Subscription Identifier (SID) in response to the subscribe request and delivering the assigned SID to the control point.

3. The method of claim 2, wherein receiving information comprises receiving, by the controlled device, information about the control point, which is mapped to the assigned SID, from the control point.

4. The method of claim 1, wherein the information about the control point comprises a Universally Unique Identifier (UUID) and a friendly name of the control point.

5. The method of claim 1, further comprising: collecting, by a policy manager, the information about the control point;
    generating, by the policy manager, the policy for the event information delivery to the control point based on the collected information about the control point; and
    delivering, by the policy manager, the generated policy to the controlled device.

6. The method of claim 5, wherein the policy comprises at least one of delivery of event information, an authentication request for event information delivery, and an encryption of event information, which are generated according to user input.

7. The method of claim 5, wherein the information about the control point further comprises a user name.

8. The method of claim 1, wherein the information about the control point is included in the subscribe request message.

9. The method of claim 1, further comprising:
    sending, by the control point, a request for detailed information about an event to the controlled device upon receiving the event;
    determining, by the controlled device, whether to encrypt the detailed information about the event, based on the policy; and
    encrypting, by the controlled device, the detailed information about the event and transmitting the encrypted information to the control point, when the controlled device determines to encrypt the detailed information about the event based on the policy.

10. The method of claim 9, wherein determining whether to encrypt the detailed information comprises:
    determining, by the controlled device, whether to encrypt detailed information about the event and whether to authenticate the control point, based on the policy; and
    receiving, by the controlled device, a password from a user of the control point and performing authentication using the password, when the controlled device determines to authenticate the control point based on the policy.

11. An apparatus for protecting personal information in a home network, comprising:
    a receiver for receiving information over the home network, and receiving a policy for event information delivery to a control point, which is generated by a policy manager based on information about the control point;
    an event manager for determining when an event occurs, controlling the event information delivery to the control point according to the policy stored in a policy information storage, and deciding whether to send an authentication request to the control point or to encrypt the event information to be delivered to the control point based on the policy;
    an authentication requester for making the authentication request based on the decision of the event manager;
    a message encryptor for encrypting the event information based on the decision of the event manager;
    a target selector for selecting a target to which the event information is to be transmitted; and
    a transmitter for transmitting the event information, and transmitting the information about the control point to the policy manager.

12. The apparatus of claim 11, further comprising:
    the policy information storage for storing the policy received from the policy manager;
    an encryption algorithm information storage for storing an encryption algorithm to be used for the encryption of the event information; and
    an authenticated-device list information storage for storing a list of authenticated control points.

* * * * *